A. R. MEACHAM.
MOVING PICTURE FILM AND METHOD OF PRODUCING THE SAME.
APPLICATION FILED OCT. 27, 1916.
1,402,879.
Patented Jan. 10, 1922.
2 SHEETS—SHEET 1.
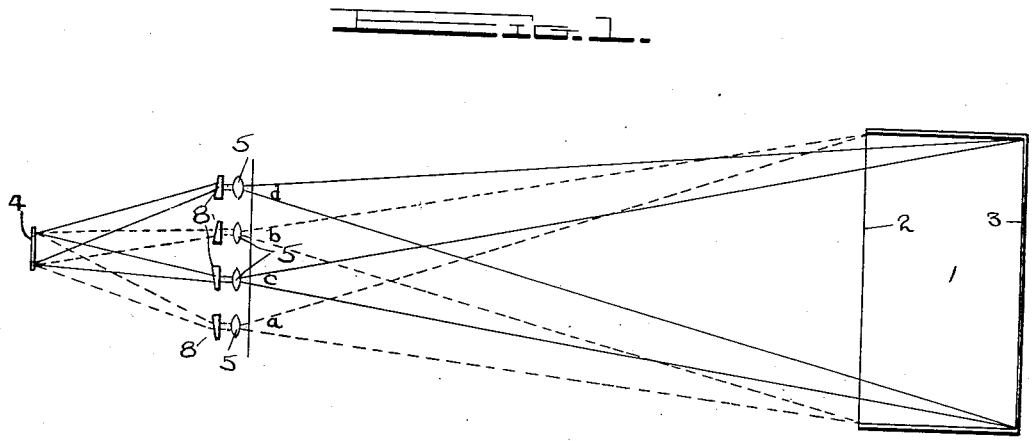
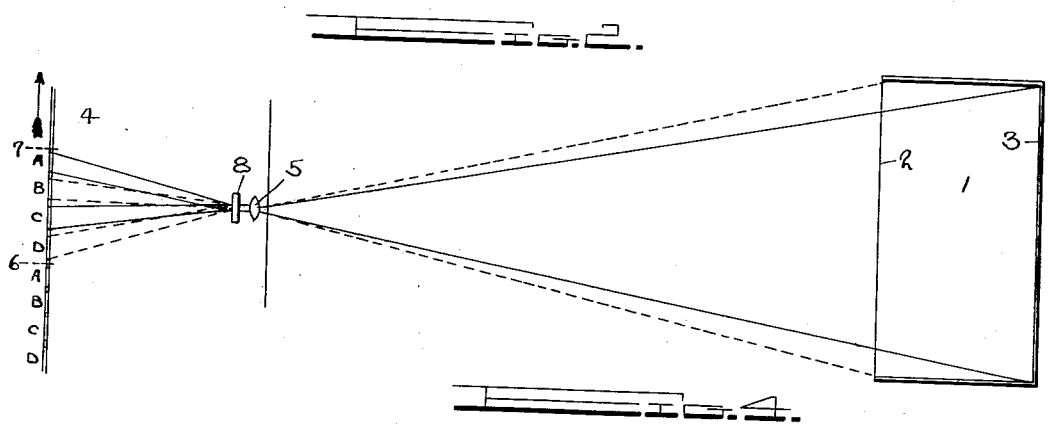
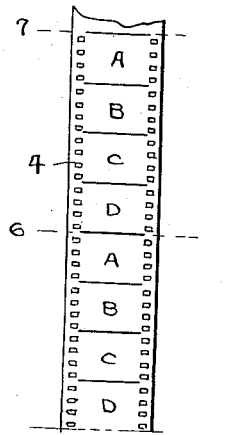
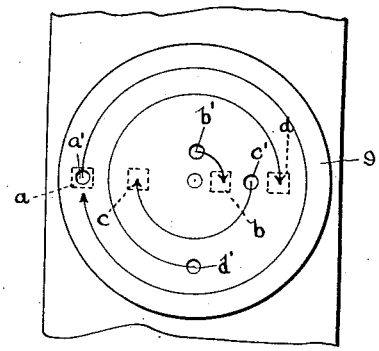
Inventor
ALDAH R. MEACHAM,
By (signature)
Attorney A. R. MEACHAM.
MOVING PICTURE FILM AND METHOD OF PRODUCING THE SAME.
APPLICATION FILED OCT. 27, 1916.
1,402,879.
Patented Jan. 10, 1922.
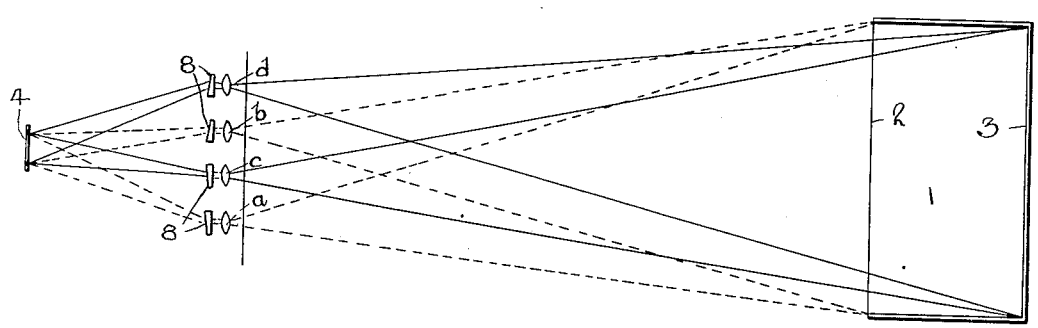
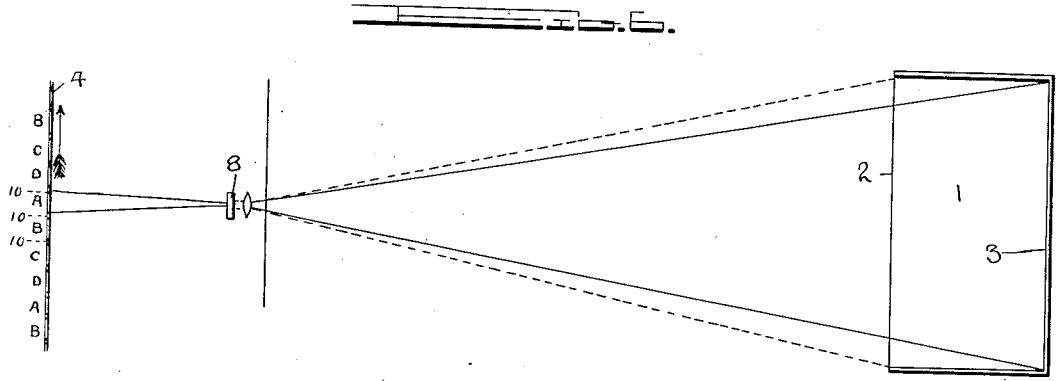
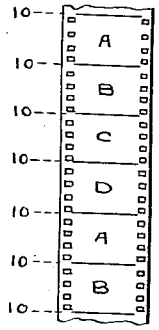
Inventor
ALDAH R. MEACHAM,
Attorney

UNITED STATES PATENT OFFICE.

ALDAH R. MEACHAM, OF OKLAHOMA, OKLAHOMA.

MOVING-PICTURE FILM AND METHOD OF PRODUCING THE SAME.

1,402,879.     Specification of Letters Patent.     Patented Jan. 10, 1922.

Application filed October 27, 1916. Serial No. 128,042.

*To all whom it may concern:*

Be it known that I, ALDAH R. MEACHAM, a citizen of the United States, residing at Oklahoma, county of Oklahoma, and State of Oklahoma, have invented certain new and useful Improvements in Moving-Picture Films and Methods of Producing the Same, of which the following is a specification.

My invention relates to motion picture apparatus and particularly to the finished film and the process or method of producing the same.

The object of my invention is to provide a photographic motion picture film which, when the images are reproduced on the screen will give the effect of relief to the pictures. A further object of my invention is to provide a film whereby the reproduced picture will have all of the parts appear in accurate focus. A further object of my invention is to provide a method of producing a film having the above characteristics. Other objects will appear hereinafter.

With these objects in view my invention consists generally in a moving picture film having the usual series of pictures and with said pictures arranged in repeated groups, each group consisting of one or more pictures taken at one angle and one or more pictures taken at another angle, whereby the reproduced picture will have the appearance of greater relief than with the ordinary method. My invention further consists in a film as mentioned with the pictures arranged in groups each group including a picture or pictures having a sharp focus on the foreground and a picture or pictures with a sharp focus on the distant portions of the picture whereby, when the pictures are reproduced the reproduced picture on the screen will have the appearance of being sharply focused in all its parts. My invention further consists in a film as mentioned in which the pictures are arranged in repeated groups, each group consisting of one or more pictures taken at one angle and one or more pictures taken at another angle and with certain of said pictures taken with a focus on the foreground and others with a focus on the distance, whereby the reproduced picture will have the appearance of relief and will also be clearly defined in all its parts. My invention further consists in the method of producing moving picture films consisting of exposing successive portions of the film successively to rays of light passing through lenses of different respective foci and then developing and fixing the film in the usual method. My invention further consists in the method as above mentioned in which the lenses employed are arranged at different angles. My invention further consists in the method of producing moving picture films consisting in exposing successive portions of the film successively through a series of lenses, certain of said lenses having a focus on the foreground and others a focus on the distance, certain of said lenses being arranged angularly with relation to the other lenses, and then developing and fixing the film in any ordinary or preferred manner.

My invention will be more readily understood by reference to the accompanying drawings forming a part of this specification and in which—

Fig. 1 is a diagrammatic plan view of a method of producing my improved moving picture film, Fig. 2 is a side elevation of the same, Fig. 3 is a diagram of the film, Fig. 4 is a diagram illustrating the arrangement of lenses and shutter, Fig. 5 is a diagrammatic plan view of a slightly modified form of the method, Fig. 6 is a diagrammatic side elevation of the same, and Fig. 7 is a diagrammatic view of the finished film.

Referring now to Figs. 1 to 4 of the drawings 1 indicates the stage containing objects to be reproduced on the film. By stage is meant the location of the objects to be photographed irrespective of whether indoors or out or on a fixed stage or in the open. 2 indicates diagrammatically the foreground of the picture and 3 the distance. 4 indicates the film upon which the images are to be reproduced and 5 a plurality of lenses employed in the camera. The camera mechanism is not illustrated in this application as the same forms no part of the present invention with the exception of the lens and shutter arrangement. Any preferred mechanism may be utilized for operating the shutter and for moving the film to receive the rays of light from the lenses.

As above stated, the finished film has the pictures arranged in repeated series, each series consisting of pictures containing one or more taken from one angle and one or more taken from another angle, and preferably one or more at a near focus and one or more at a distant focus. To simplify the description and understanding of the invention I have illustrated in Fig. 3 the picture groups as consisting of a picture A focused on the foreground from one angle, a picture B focused on the foreground from a different angle, a picture C focused on the distance from one angle, and a picture D focused on the distance from a different angle. It is to be understood that I am not limited to the number or arrangement of any of the pictures A, B, C and D, as either or all of them may be multiplied as found necessary or desirable to produce the desired effect on the screen, the variation and arrangement of the pictures on the film being dependent solely upon the shutter and the film feed mechanism.

As shown in Figs. 1 to 3, the group of pictures is taken and then the film is moved from a distance equal to the length of the group, that is, from the line 6 to the line 7 of Figs. 2 and 3 and then the group is repeated. It is of course desirable, to produce the proper stereoscopic effect that the lenses should be arranged in a horizontal line, and if the film is to be fed vertically, in the usual manner, means must be provided for deflecting the rays passing from the lenses to the film so as to bring the same into vertical alinement. To this end I have shown the lenses as including prisms 8, the function of which is obvious.

In Fig. 4 I have shown the lenses $a$, $b$, $c$ and $d$ in conjunction with a rotary shutter 9 having a series of apertures $a'$, $b'$, $c'$ and $d'$, which register successively with the several lenses with each rotation of the shutter.

In Figs. 5 to 7 I have illustrated diagrammatically the same principle applied to an arrangement wherein the film is moved the distance of one picture with each exposure, as in the usual method, that is, the film is moved the distance between the lines 10 of Figs. 6 and 7. This modification varies from the preceding merely in the fact that the lenses $a$ to $d$ including the respective prisms 8 are so arranged as to project the rays of light on to a single spot or exposed portion of the film. This may, in many instances, depending upon the nature of the picture, prove preferable as it avoids the large single movement of the film necessitated in the preceding form of the invention.

The film thus formed may be reproduced in the ordinary projecting machine and owing to the rapidity of the successive exposures the picture will have the stereoscopic effect due to the fact that the several pictures of each group are taken at different angles and will also give clear definition of both near and distant objects. These effects are produced by the blending of the several pictures at different angles and at different foci.

I claim:

1. The method of producing moving picture films consisting of exposing successive portions of the film to rays of light passing through differently focused lenses successively and then developing and fixing the film, substantially as described.

2. The method of producing moving picture films consisting in exposing successive portions of the film successively through differently focused lenses of spaced relation successively and then developing and fixing the film, substantially as described.

3. A moving picture film having a plurality of pictures arranged in groups, each group comprising one or more pictures with a clearly defined foreground and one or more pictures with a clearly defined middle distance or distances, substantially as described.

4. A moving picture film having a series of pictures thereon arranged in groups, each group having a plurality of pictures taken from two different angles and certain pictures sharply defining the foreground and others sharply defining the distance, substantially as described.

5. The method of producing pictures possessing stereoscopic relief, which consists in recording a plurality of related images of the subject in planes parallel with and substantially spaced from each other, with each image in its proper focus.

6. The method of producing pictures possessing stereoscopic relief, which consists in successively recording a plurality of related images of a subject in planes parallel with and substantially spaced from each other, with each image in its proper focus.

7. A film for optical projection having images thereon in focus indicative of analytic parallel planes of the subject substantially spaced from each other.

8. A film for optical projection having images thereon in focus indicative of analytic parallel planes of the subject, substantially spaced from each other, the images indicative of different planes being alternately arranged.

In testimony whereof I have signed my name to this specification in the presence of two subscribing witnesses.

ALDAH R. MEACHAM.

Witnesses:
J. S. COATES,
WANDA OTTO.